(12) United States Patent
Grandhi et al.

(10) Patent No.: US 9,947,119 B2
(45) Date of Patent: *Apr. 17, 2018

(54) USER INTERFACE FRAMEWORK FOR VIEWING LARGE SCALE GRAPHS ON THE WEB

(71) Applicant: eBay Inc., San Jose, CA (US)

(72) Inventors: Roopnath Grandhi, Santa Clara, CA (US); Hill Trung Nguyen, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/473,929

(22) Filed: Aug. 29, 2014

(65) Prior Publication Data

US 2015/0054831 A1 Feb. 26, 2015

Related U.S. Application Data

(63) Continuation of application No. 12/263,367, filed on Oct. 31, 2008, now Pat. No. 8,823,709.

(Continued)

(51) Int. Cl.
G06T 11/20 (2006.01)
G06F 17/30 (2006.01)

(52) U.S. Cl.
CPC ...... *G06T 11/206* (2013.01); *G06F 17/30259* (2013.01); *G06F 17/30994* (2013.01)

(58) Field of Classification Search
None
See application file for complete search history.

(56) References Cited

U.S. PATENT DOCUMENTS 5,276,789 A 1/1994 Besaw et al.
6,144,962 A 11/2000 Weinberg et al.
(Continued)

FOREIGN PATENT DOCUMENTS

WO WO-09058392 A2 5/2009
WO WO-09058392 A3 5/2009

OTHER PUBLICATIONS

"U.S. Appl. No. 12/263,367, Response filed May 31, 2012 to Final Office Action dated Jan. 31, 2012", 11 pgs.

(Continued)

*Primary Examiner* — M Good Johnson
(74) *Attorney, Agent, or Firm* — Schwegman Lundberg & Woessner, P.A.

(57) ABSTRACT

Various embodiments provide a computer-implemented system and method providing a user interface framework for viewing large scale graphs. An example embodiment includes obtaining graph data including information related to a plurality of nodes, the plurality of nodes corresponding to search queries performed on a particular host site; constructing a plurality of sub-graphs, the sub-graphs being clusters of search results that are formed based on an amount of overlap among the search results produced from the search queries; rendering the graph by displaying each of the plurality of nodes at a respective absolute position within the graph and generating a plurality of tiles representing images of the plurality of sub-graphs; and displaying a sub-graph image corresponding to a selected position and zoom level.

20 Claims, 18 Drawing Sheets

Related U.S. Application Data

(60) Provisional application No. 60/984,675, filed on Nov. 1, 2007.

(56) References Cited

U.S. PATENT DOCUMENTS

| | | | |
|---|---|---|---|
| 6,369,819 B1 | 4/2002 | Pitkow et al. | |
| 6,437,799 B1 | 8/2002 | Shinomi | |
| 6,509,898 B2 | 1/2003 | Chi et al. | |
| 6,526,440 B1 | 2/2003 | Bharat | |
| 6,567,810 B1 | 5/2003 | Singhal | |
| 6,714,936 B1 | 3/2004 | Nevin | |
| 6,781,599 B2 | 8/2004 | Abello et al. | |
| 6,963,867 B2 | 11/2005 | Ford et al. | |
| 7,075,536 B1 | 7/2006 | Goldschmidt | |
| 7,260,789 B2 | 8/2007 | Hunleth et al. | |
| 7,292,246 B2 | 11/2007 | Goldschmidt | |
| 7,296,009 B1 | 11/2007 | Jiang et al. | |
| 7,409,679 B2 | 8/2008 | Chedgey et al. | |
| 7,640,267 B2 | 12/2009 | Spivack et al. | |
| 7,672,950 B2 | 3/2010 | Eckardt, III et al. | |
| 7,716,198 B2 | 5/2010 | Meyerzon et al. | |
| 7,725,505 B2 | 5/2010 | Bonev et al. | |
| 7,761,448 B2 | 7/2010 | Meyerzon et al. | |
| 7,779,147 B1 | 8/2010 | Wang et al. | |
| 7,809,801 B1 | 10/2010 | Wang et al. | |
| 7,827,181 B2 | 11/2010 | Petriuc | |
| 7,840,524 B2 * | 11/2010 | Egger | G06F 17/30321 382/225 |
| 7,853,930 B2 | 12/2010 | Mitchell et al. | |
| 7,870,118 B2 | 1/2011 | Jiang et al. | |
| 7,930,730 B2 | 4/2011 | Brewer et al. | |
| 8,015,183 B2 | 9/2011 | Frank et al. | |
| 8,019,786 B2 | 9/2011 | Nevin, III | |
| 8,156,112 B2 | 4/2012 | Stephens | |
| 8,326,823 B2 | 12/2012 | Grandhi et al. | |
| 8,402,031 B2 | 3/2013 | Govani et al. | |
| 8,494,897 B1 | 7/2013 | Dawson | |
| 8,823,709 B2 | 9/2014 | Grandhi et al. | |
| 2002/0154175 A1 | 10/2002 | Abello et al. | |
| 2004/0090472 A1 * | 5/2004 | Risch | G06F 17/30716 715/853 |
| 2005/0120030 A1 | 6/2005 | Varpela et al. | |
| 2005/0210008 A1 | 9/2005 | Tran et al. | |
| 2006/0095852 A1 | 5/2006 | Trepess et al. | |
| 2006/0235810 A1 | 10/2006 | Wen et al. | |
| 2007/0038620 A1 | 2/2007 | Ka et al. | |
| 2007/0143266 A1 | 6/2007 | Tang et al. | |
| 2007/0174872 A1 | 7/2007 | Jing et al. | |
| 2008/0109327 A1 * | 5/2008 | Mayle | G06Q 30/0641 705/27.1 |
| 2008/0133508 A1 | 6/2008 | Jiang et al. | |
| 2008/0238941 A1 | 10/2008 | Kinnan et al. | |
| 2009/0006311 A1 | 1/2009 | Ting et al. | |
| 2009/0024962 A1 | 1/2009 | Gotz | |

OTHER PUBLICATIONS

"U.S. Appl. No. 12/263,367 , Response filed Nov. 7, 2013 to Final Office Action dated Aug. 7, 2013", 11 pgs.

"U.S. Appl. No. 12/263,367 , Response filed Nov. 21, 2011 to Non Final Office Action dated Jun. 21, 2011", 10 pgs.

"U.S. Appl. No. 12/263,367, Final Office Action dated Jan. 31, 2012", 10 pgs.

"U.S. Appl. No. 12/263,367, Final Office Action dated Aug. 7, 2013", 12 pgs.

"U.S. Appl. No. 12/263,367, Non Final Office Action dated Mar. 7, 2013", 9 pgs.

"U.S. Appl. No. 12/263,367, Non Final Office Action dated Jun. 21, 2011", 9 pgs.

"U.S. Appl. No. 12/263,367, Non Final Office Action dated Dec. 4, 2013", 10 pgs.

"U.S. Appl. No. 12/263,367, Notice of Allowance dated Apr. 23, 2014", 5 pgs.

"U.S. Appl. No. 12/263,367, Response file Mar. 4, 2014 to Non Final Office Action dated Dec. 4, 2013", 11 pgs.

"U.S. Appl. No. 12/263,367, Response filed Jun. 6, 2013 to Non Final Office Action dated Mar. 7, 2013", 29 pgs.

"International Application Serial No. PCT/US2008/012425, Search Report dated May 20, 2009", 2 pgs.

"International Application Serial No. PCT/US2008/012425, Written Opinion dated May 20, 2009", 4 pgs.

Brin, S., et al., "The anatomy of a large-scale hypertextual Web search engine", Proceedings of the Seventh International World Wide Web Conference (WWW7 '98), (Apr. 1998), 107-117.

Kleinberg, et al., "The Web as a graph: measurements, models and methods", Computing and cominatorics, Springer Berlin, Heidelberg., (1999), 1-17.

Kleinberg, Joe, "Authoritative Sources in a Hyperlinked Environment", Proc. Ninth Ann. ACM-SIAM Symp. Discrete Algorithms, (1998), 604-632.

Kumar, et al., "The Web as a graph", ACM, (2000), 1-10.

* cited by examiner

USER INTERFACE FRAMEWORK FOR VIEWING LARGE SCALE GRAPHS ON THE WEB

PRIORITY APPLICATION

This application is a continuation of and claims the benefit of priority under to U.S. patent application Ser. No. 12/263,367, filed on Oct. 31, 2008, which claims the benefit of U.S. Provisional Patent Application Ser. No. 60/984,675, filed Nov. 1, 2007, the benefit of priority of each of which is claimed hereby, and each of which are incorporated by reference herein in their entirety.

COPYRIGHT NOTICE

A portion of the disclosure of this patent document contains material that may be subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008, eBay Inc. All Rights Reserved.

BACKGROUND

Technical Field

This disclosure relates to methods and systems supporting computing and data processing systems. More particularly, the disclosure relates to a user interface framework for viewing large scale graphs.

Related Art

In the last few years we have seen rapid growth in online applications such as social networks and web search and navigation interfaces like tag clouds. Visualizing and navigating through large networks of information like networks of social connections or networks of related content are becoming increasingly popular. While the need for such applications is increasing, complexity and scale of the underlying data pose challenges to building facilitating technologies.

Graph based information visualization technologies have proven indispensable tools for making sense of complex data by representing the data in the form of nodes and edges where nodes represent some form of entity and edges represent relationships between the nodes. For example, for a search interface, group the results into clusters and providing an interface to visualize that as a graph and navigate through the labels of the nodes which represent clusters would be a useful interface. In fact, we use this as a running use case throughout this paper.

Unfortunately there are a number of challenges to visualizing and navigating through large graphs of data. Research in graph visualization has so far been mainly focused on graph drawing and layout algorithms.

Real time rendering and navigation of large-scale graphs on a thin-client may be a challenge. As the graph becomes dense and the relative position of a node with another node in the graph changes continuously as the layout is updated based on the user selection of the node. This makes it confusing for the users and poses a user-experience challenge. Another complexity of the web based graph visualization tools is that for large scale adoption, the rendering and drawing of the graph has to be done on the browser without downloading external plug-ins, applets or software.

Thus, a computer-implemented system and method providing a user interface framework for viewing large scale graphs are needed.

BRIEF DESCRIPTION OF THE DRAWINGS

Embodiments illustrated by way of example and not limitation in the figures of the accompanying drawings, in which.

DETAILED DESCRIPTION

Figure 1:
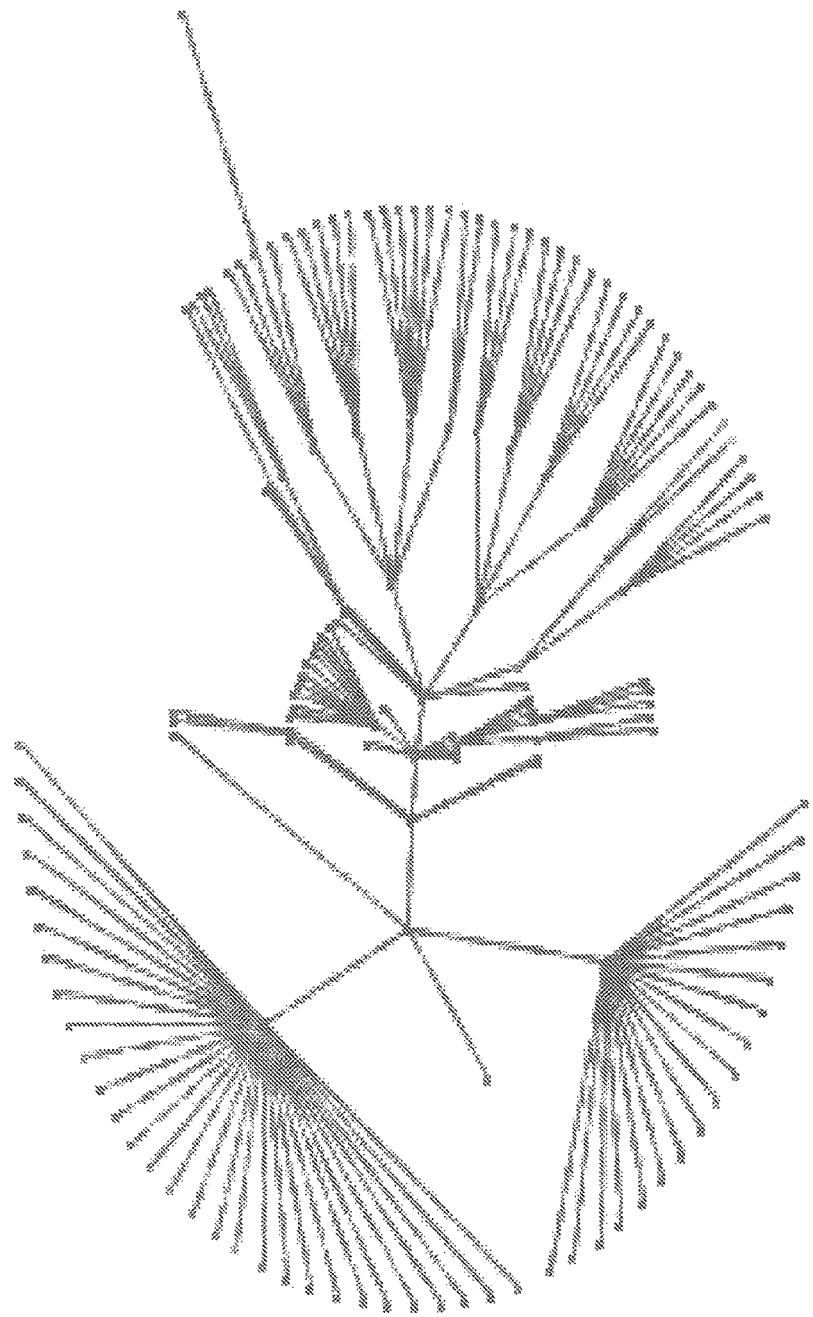
FIGS. 1-3 illustrates examples of visualization techniques.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method providing a user interface framework for viewing large scale graphs. Various embodiments are described below in connection with the figures provided herein.

Overview

Example embodiments seek to address some of the challenges and problems with existing solutions. The various embodiments provide a scalable way to navigate a graph over a browser. With this goal in mind, we have designed the Hyades graph interface framework, as an example embodiment.

One example of embodiment is a graph based framework. The web map interface provides an intuitive interface for navigating geographical data in the browser without downloading any external software or plug-ins. The ability to move between geographical regions in any direction with a mouse drag and the ability to zoom in at various levels are key features. Our graph framework combines traditional graph layout and visualization techniques with web map navigation features. In one example embodiment, we assign absolute positions for the nodes similar to addresses in the geographical world. By taking the approach of assigning absolute positions to the nodes in the graph and adapting the existing layout algorithms to assign absolute positions, we are marrying the best of the graph world and geographical world.

The user interface framework we have designed is extensible and can be reused for different application domains. The framework provides a way to separate the complex graph layout algorithms and the user interface part. Any graph layout algorithm can be adaptable to the framework as long as it provides the graph data according to the specifications of the framework. We apply the framework on real world problem of visualizing the search result clusters.

With the arrival of Web2.0 technologies like AJAX and compelling applications like tag clouds, social networks and interactive maps, graph-based applications have received a new life on the Internet. We describe an example framework to visualize and navigate through large graph structures to facilitate a novel user experience on the web.

Detailed Description of an Example Embodiment

The inherent advantages in web application can be understood when we analyze the problems with the traditional desktop fat client applications. Though the richness of the user interface in a desktop application is high, the user has to download a client application and launch it on the desktop. It is difficult to get new data and upgrades to the client without another install process. The web application solves several of these problems easily, because the web application and its corresponding data are stored on a server the entire application deployment process is greatly simplified web applications help in large-scale adoption as the user is not needed to download an external piece of software to run the application. Though there are many benefits to web applications the interactive user interface in these applications has to match the richness in desktop for it to be effective.

Graph Visualization

Figure 2:
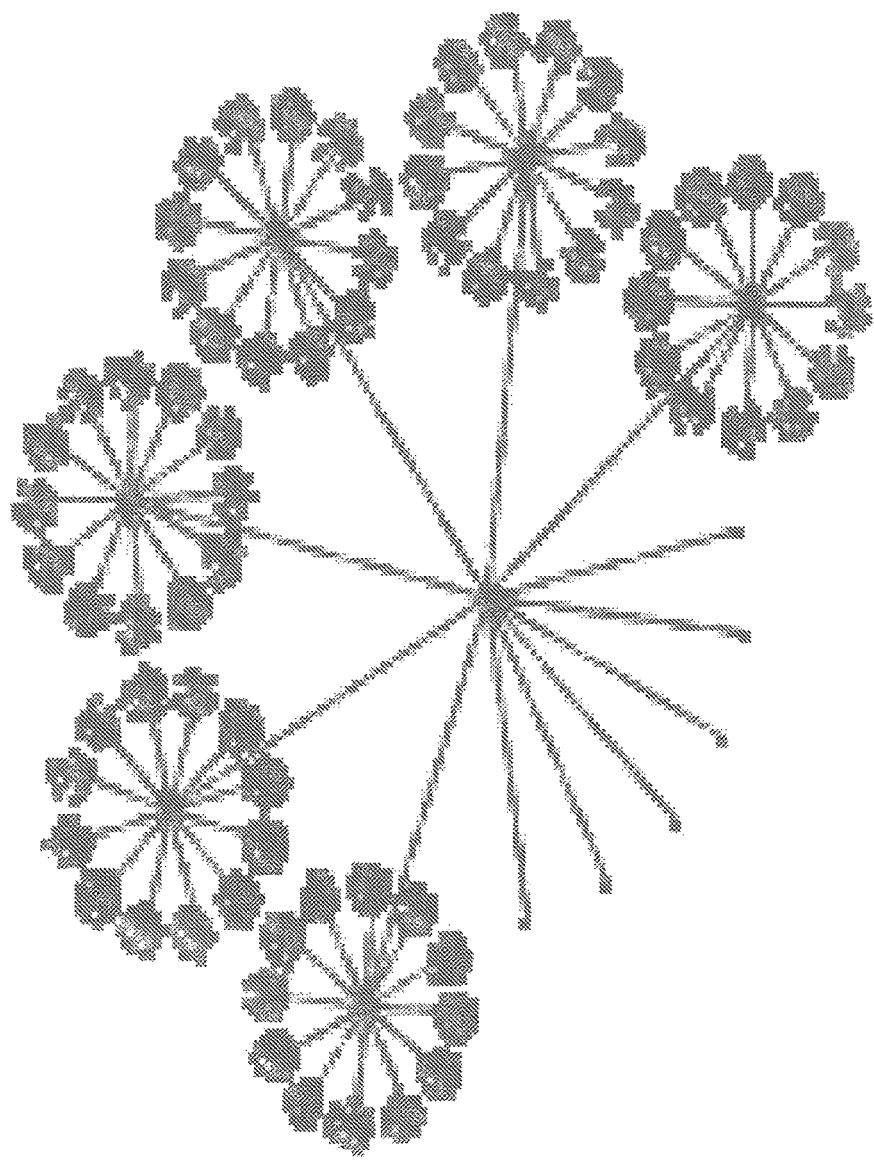
Figure 3:
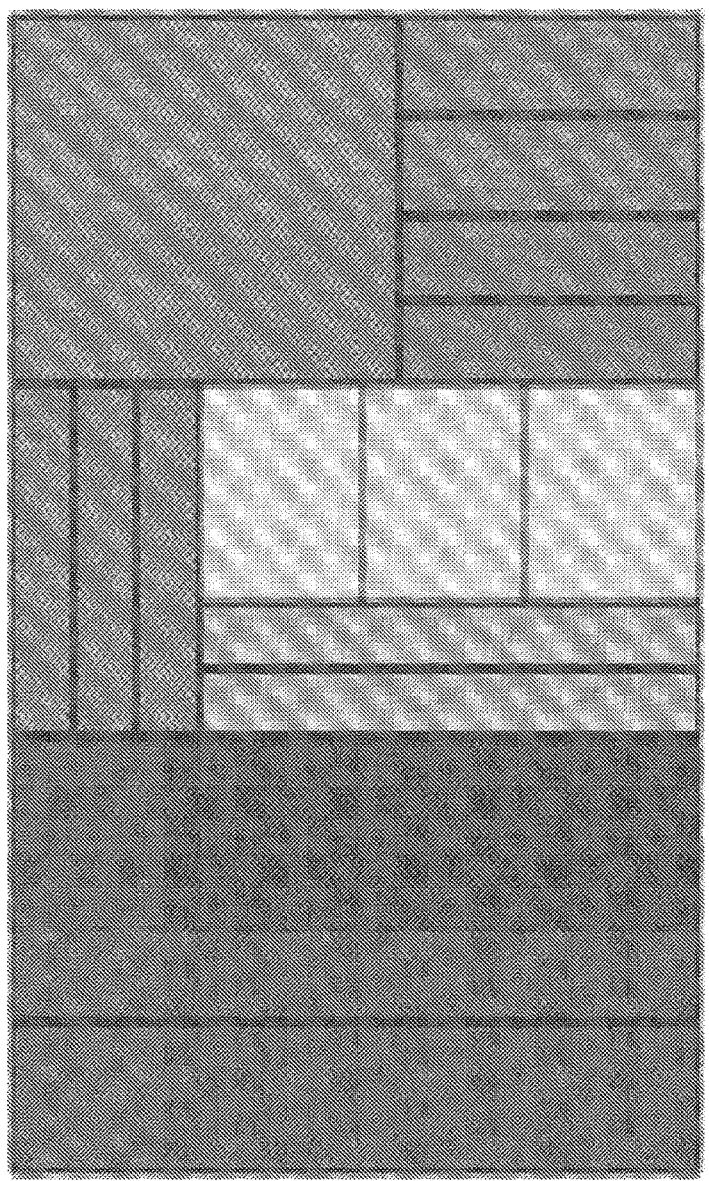

Graph Visualization is a large research area and has various sub-fields in it like graph drawing and graph layout. The past two decades of research have produced novel visualization techniques like radial view (see FIG. 1), balloon view (see FIG. 2), and tree-map (see FIG. 3).

Most of the initial research focused on graph drawing and layout of small scale graphs. The graph size is a key factor in graph visualization both in terms of computation and comprehensibility. As the number of nodes and edges in the graph become large the computation limits of the viewing platform may reach its limit and detailed understanding of the graph becomes tough. One way to navigate the graph on the browser is for users to click on any node on the graph and the corresponding sub graph expands. Such interface becomes complex as users click more nodes and the nodes have to be moved in real-time to adjust for expansion and contraction. A more effective way is to make the graph nodes not movable and to navigate the graph the users would be able to drag the layer to see more portions of the graph.

Figure 4:
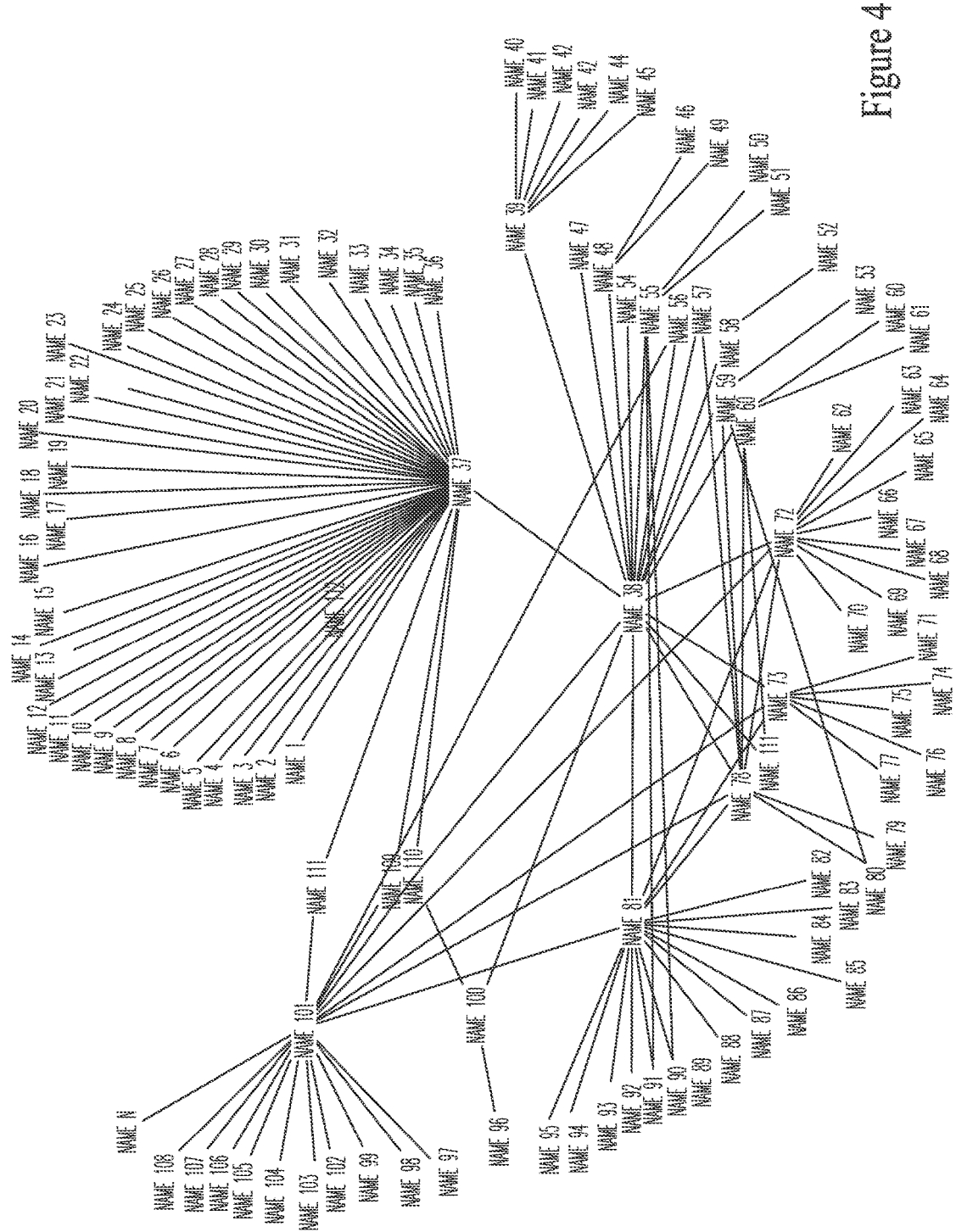
FIGS. 4 and 5 illustrate screenshots of two applications using the prefuse toolkit.
Figure 5:
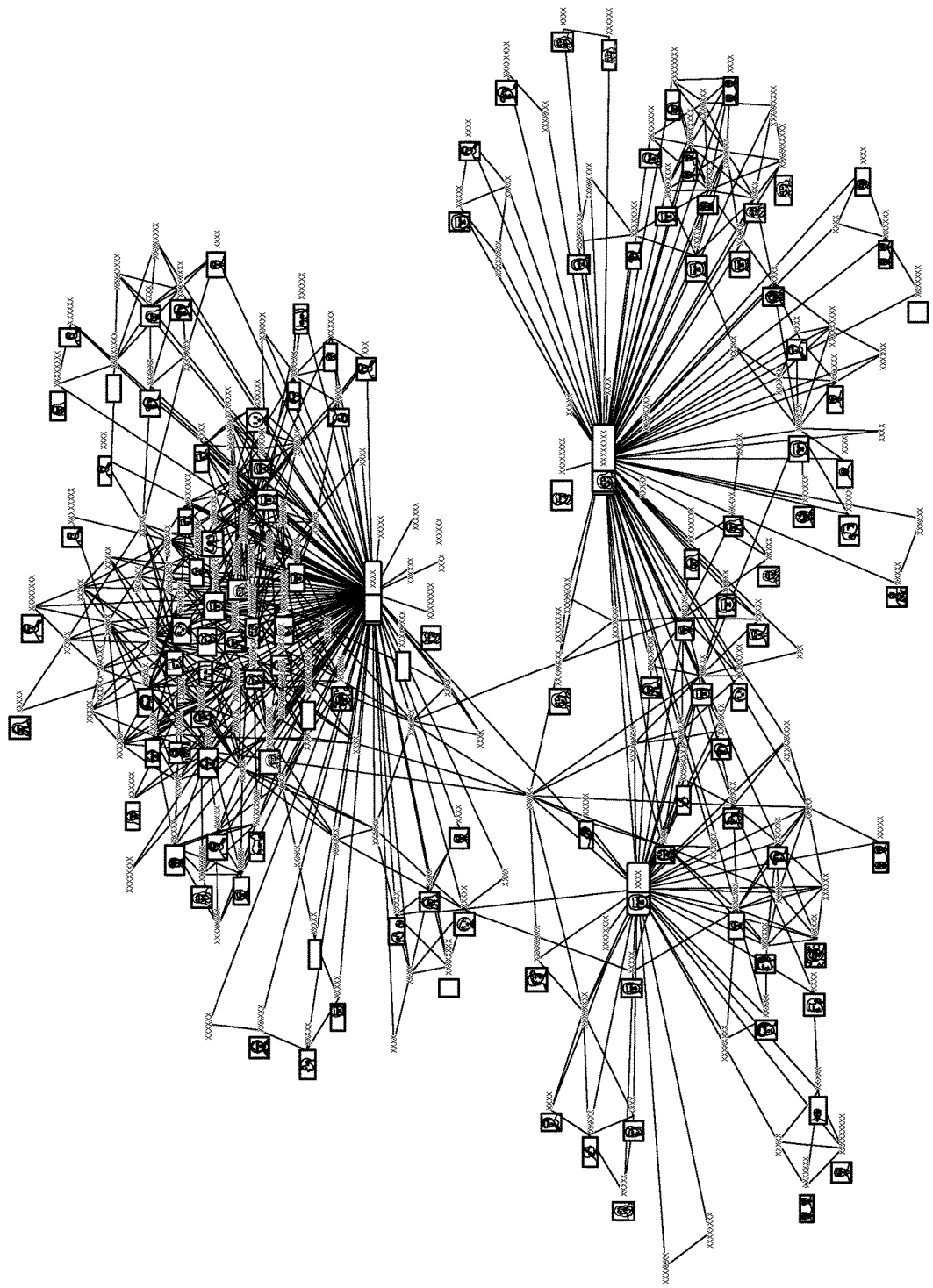

Both of these problems get difficult when we move from fat-client to web browser. There has been a dearth of tools to visualize graphs online that provides better user experience and scalability to view large graphs. More recently, a prefuse toolkit is introduced which provides a higher level access to various graph layout algorithms and produces a user interface. FIG. 4 illustrates a screenshot of two applications using this toolkit. Even in the prefuse toolkit, the user has to download the applet and the graph begins to become dense and incomprehensible when few nodes are expanded. The relative position of the nodes changes upon each user selection and can be confusing to the user. An example embodiment seeks to address these problems by providing a framework that assigns absolute positions to the nodes similar to addresses in the geographical world as seen in web based map applications. FIG. 5 illustrates a Google Maps application showing geographical images at two zoom levels. Key functions of the map interface include navigating from region to region using pan and zooming in and out to see more or less details respectively. The whole map is stored in the form of tiles of sub images and on the client side interface AJAX is used to retrieve and dynamically update the images.

Web Map Applications

Figure 6:
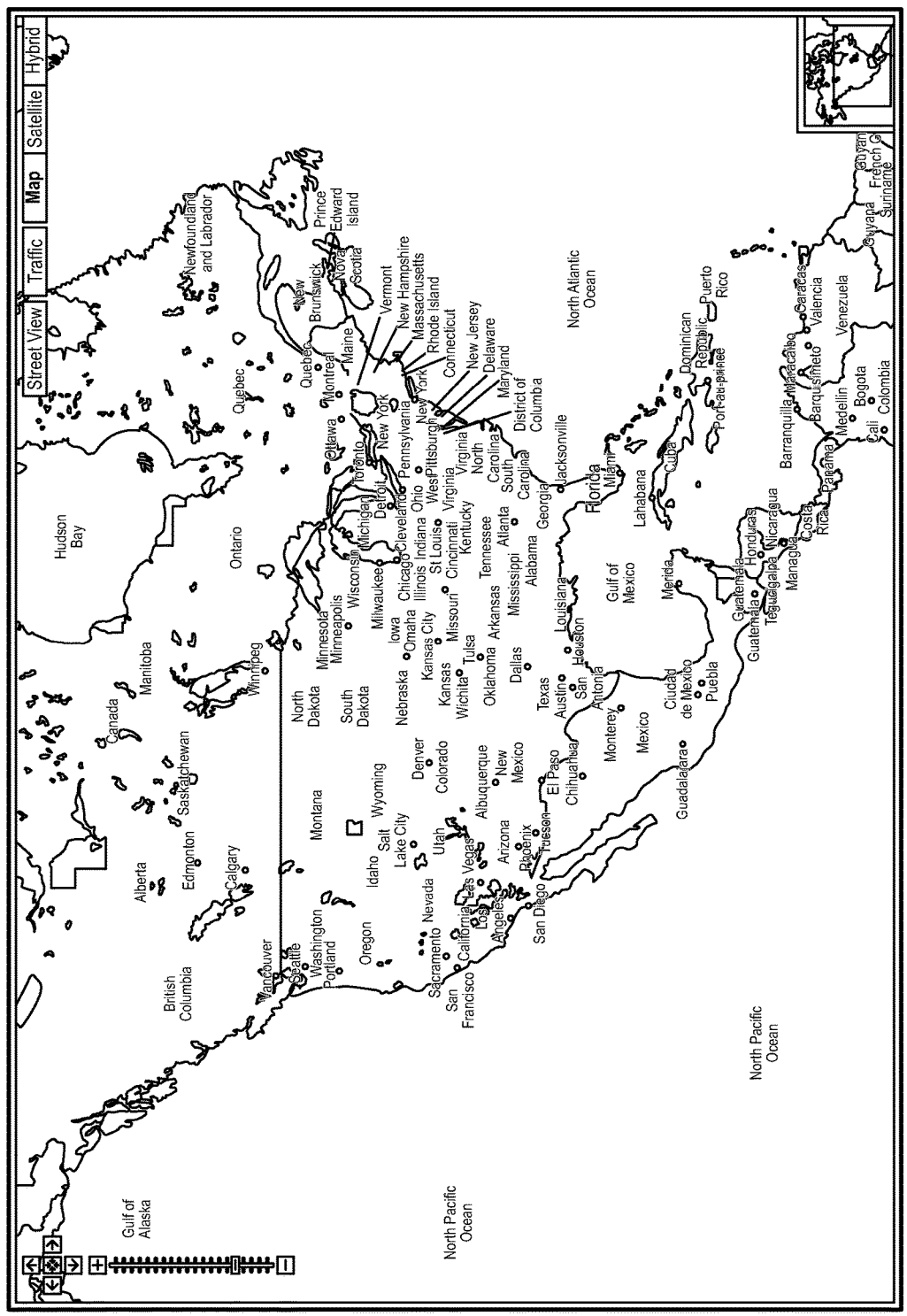
FIGS. 6 and 7 illustrate examples of a Google Maps application showing geographical images at two zoom levels.
Figure 7:
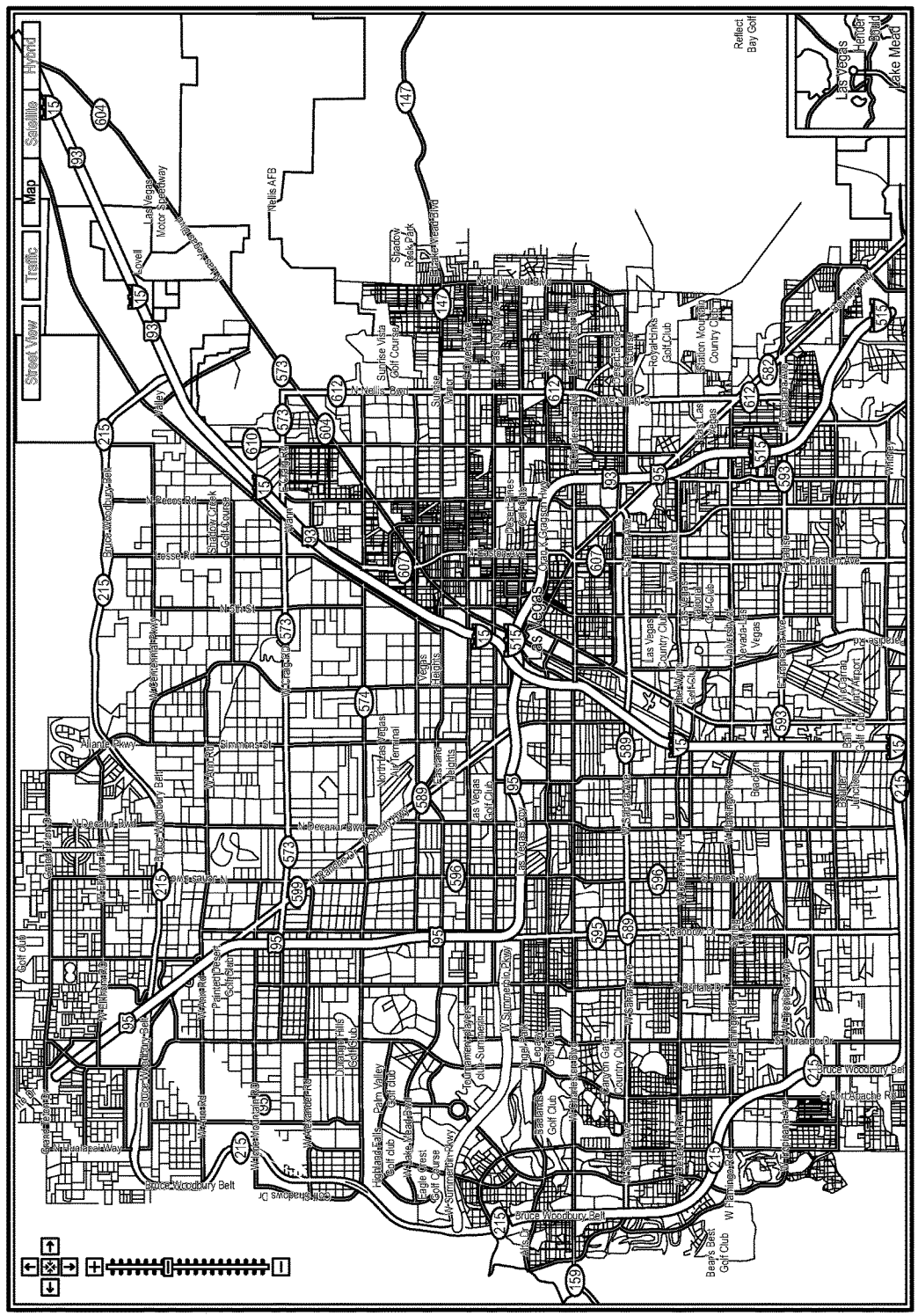

Web based map applications like Google Maps, Yahoo Maps and Microsoft Maps provide an intuitive mapping interface with detailed street and aerial imagery data where users can navigate between geographical regions by a mouse drag. The users would be able to zoom in at various levels to see more detailed information. For example at a lower zoom level (see FIG. 6), we see the state level information and main cities while at a higher zoom level (see FIG. 7), we may see city level information with detailed view of the streets.

Consider the Google Maps application, which popularized the concept of AJAX. Here the map is displayed using images and the user need not download any external piece of software to view the application. The problem of downloading huge images of the geographical regions on the client side is solved by dividing the geographical map into sub images using the latitude and longitude information. The application makes use of AJAX to retrieve and update the sub images dynamically.

In web based map applications, the absolute positions of latitude and longitude which already exists for each physical position in the map simplifies the layout problem. When we want to visualize non-geographical information (e.g., the graph of search result clusters in the context of a host site such as eBay), there is no concept of fixed absolute positions to nodes such as "ipod" or "johnny depp" to take advantage of spatial mapping in the interface.

Accordingly, an example embodiment provides user interface framework which assigns absolute positions to the nodes of the graph and provide user experience features similar to those in the geographical maps.

Dynamic Drawing Vs. Static Images

Given a sub-region of the graph, we need to render the graph on canvas, e.g. draw all the nodes and edges and any corresponding meta data. We have provided two example approaches described herein to solve this problem. One is that we may do real-time drawing of the graph by using Scalable Vector Graphics (SVG) or other similar graphics languages to render the nodes and edges of the sub-graph. A disadvantage of this approach is that the computation on the thin client may become expensive and not all browsers support SVG to a full extent. To better separate the graphics layer from the framework and to minimize computation loads on the client side, another approach is to generate the static image snapshots of the sub graphs and storing them on the server. We still use SVG on the server side to generate the static image snapshots while at the client side on the browser, we use java script and XML to dynamically retrieve the images of sub graphs as needed.

Graphics Rendering Language

Scalable Vector Graphics (SVG) is an XML markup language to build static and animated graphic displays in the browser. SVG is an open standard created by the W3C (World Wide Web Consortium) so that different graphical interfaces can render the same SVG represented graphic in the same way. Many browsers provide native support of rendering the SVG including cell phones and mobile devices. Microsoft is expected to promote a different XML-based language called XAML for creating user interfaces. The framework uses SVG to render the nodes and edges of the graph.

Hyades Graph Framework

In an example embodiment, the framework accepts a graph with node and edge information. Graphs can be directed or un-directed. In the embodiments described herein, we consider undirected graphs. But, note that the framework described herein works also for directed graphs. An undirected graph G=(V, E) consists of a finite set V of vertices and a finite set of edges E subset of V×V where each edge e=(u, v)∈ E connects two vertices u and v. The graph layout component computes the layout of the graph and then assigns an absolute relative position to each node of the graph. The rendering component renders the graph as images based on the node positions. The rendering is done on the backend and the generated images of the graph are stored as static images. On the client side, AJAX is used to retrieve dynamically the images of the graph as the user pans and zooms to explore the graph. Each suitable application can use different layout algorithms as long as the layout information is encoded as specified by our framework.

Figure 8:
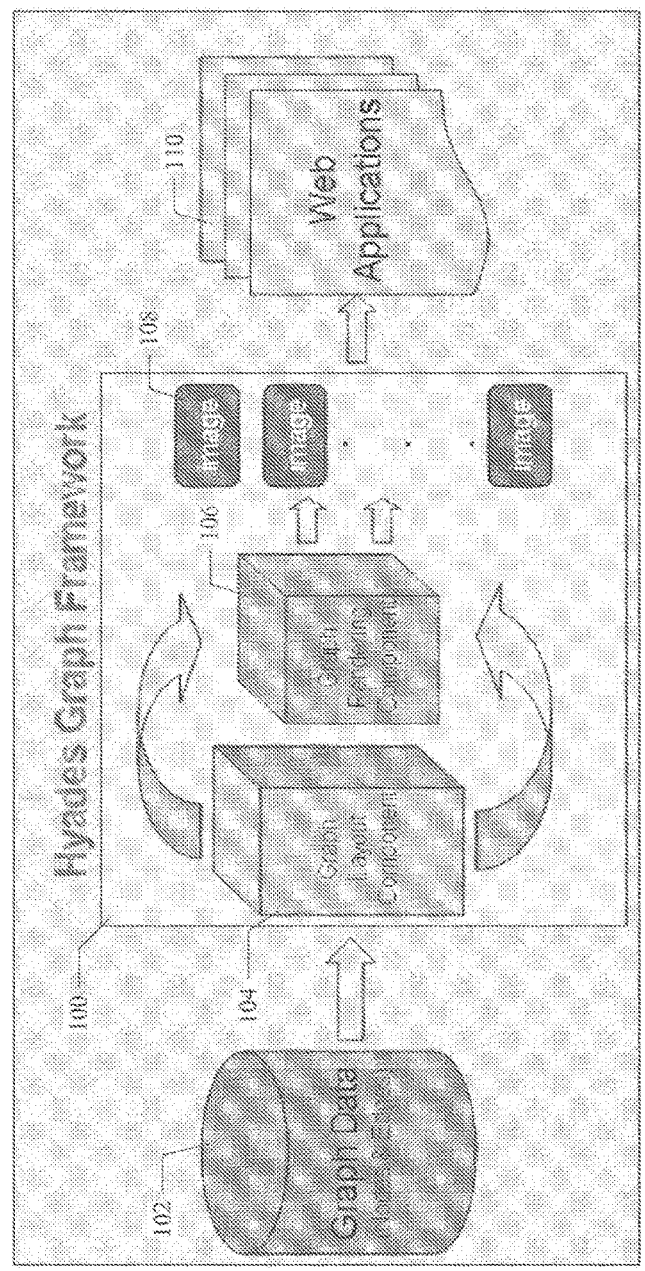
FIG. 8 illustrates an example embodiment of the Hyades Graph Framework, which can provide a user interface framework for viewing large scale graphs.

FIG. 8 illustrates an example embodiment of the Hyades Graph Framework, which can provide a user interface framework for viewing large scale graphs. The input to the framework is graph data (e.g., with nodes and edges). A graph layout component processes the graph information and computes absolute position information, which is passed on to a graph rendering component. The graph rendering component processes the position information and uses a sliding window approach to render sub graph regions and produce the corresponding images stored on the server. At run time on the client side, AJAX is used to dynamically retrieve and update the graph using the images on the server.

Features of the Framework of a Particular Embodiment

Spatial Mapping of Graph Layout

The example framework of a particular embodiment provides the ability to navigate the graph by assigning absolute spatial co-ordinates to each of the nodes of the graph. This enables the provision of seamless navigation by moving from one sub-region of the graph to another sub region. Though the position of a sub graph or a node does not have direct relation with the physical address as in geographical maps, this plays a key role in solving the navigation and computation problems.

Zoom and Pan of the Graph

Zoom and pan are useful tools to navigate and explore the graphs. The framework, according to the example embodiment, supports both zoom and pan of the graph. The panning of the graph allows the user to explore the graph incrementally. To enable such panning, the data of the graph should be represented using fixed relative co-ordinates. A particular embodiment can use either of two types of zooming, Geo-metric and Semantic. In the Geometric zooming, edges are stretched or shrunk when zooming in or out respectively. In the semantic zooming, different details of information are maintained at different zoom levels. Clearly, semantic zooming enables more comprehensibility of the graph than the geometric zooming. One embodiment of the framework supports semantic zooming. Semantic zooming in the geographical maps is achieved by maintaining different views of the map at city level and at the street level, etc. In the context of the graph, the framework achieves semantic zooming by maintaining nodes and edges at different zoom levels. At a lower zoom level, more important nodes and their edges are defined. As we approach higher zoom levels, the graph becomes more detailed and dense. Different image snapshots for the graph are generated and maintained at the server to enable such semantic zooming on the browser side. The number of zoom levels in a graph can change depending upon the application and can be configured in the framework when providing the data of the graph.

Node Attributes

Along with the node data like node text, different visual attributes of the node like node shape, node size, node color, node font, etc. can be defined in the input graph data. Node shape may be a circle, ellipse or rectangle. The size of the node can be specified at each of the zoom levels. In the context of circle node, size indicates the radius of the node. The size of a node in the graph may denote the importance of the node relative to other nodes. The application may define the node size of the corresponding nodes of the graph based on several properties, for example in the search results cluster application of a host, such as eBay, size of the node may indicate the number of search queries that occurred at that node. Other properties of the node, like node color, may indicate special meaning according to the application.

Search

The framework of a particular embodiment supports keyword search of the graph. In the web maps application when an address is searched for, the address is first converted into a physical location in the map and then the corresponding region of the geographical map is displayed. Similarly the framework supports keyword search by converting the keywords into absolute positions in the graph and then display the region of the corresponding sub graph. To achieve this, mapping between the keywords of the graph node and their absolute positions are stored in the server. When there is no graph node that matches the input search query the nodes are sorted by relevance and the graph region around the best relevant node is displayed.

Dynamic Content Using Overlays

Figure 9:
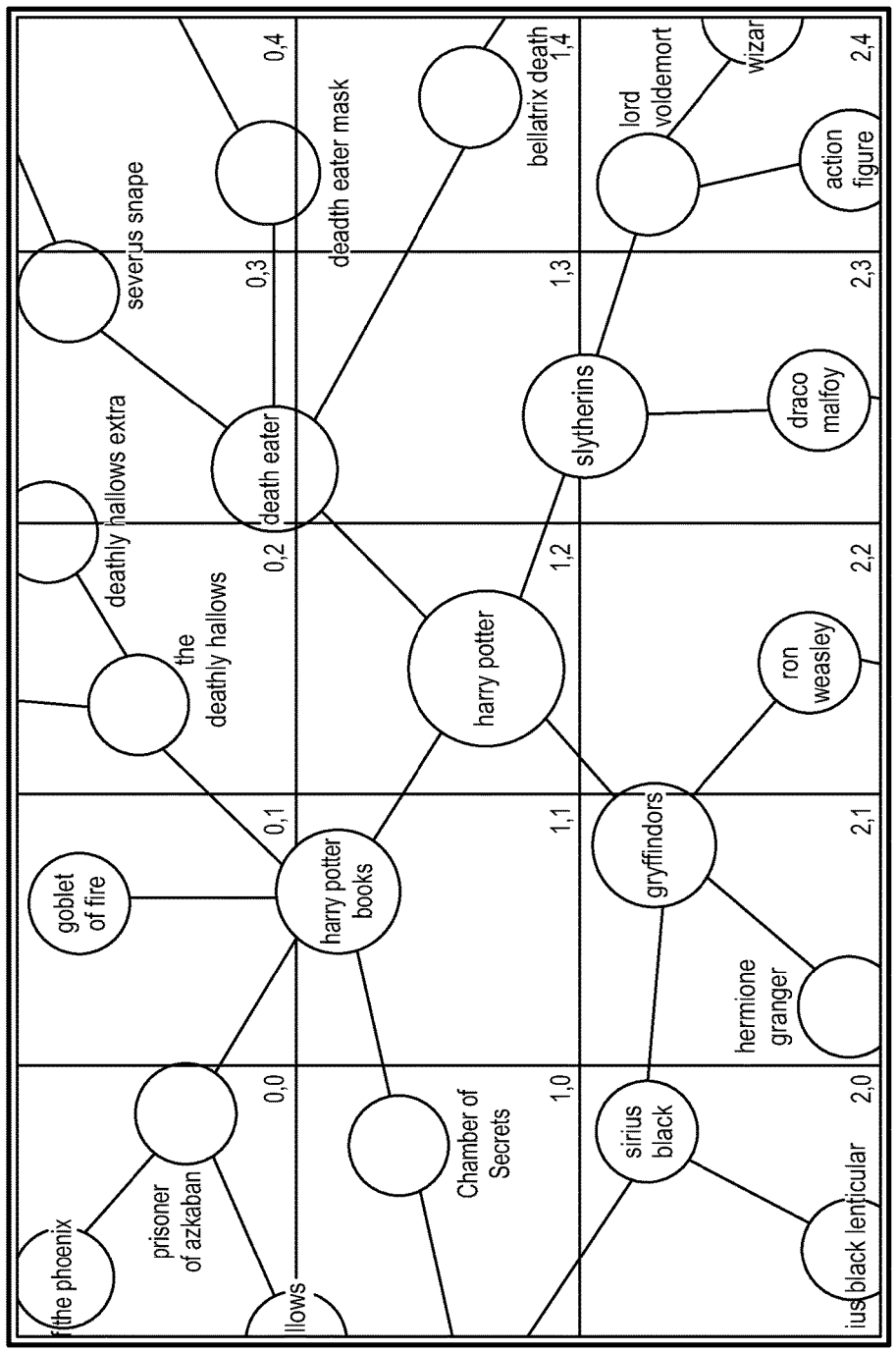
FIG. 9 illustrates an example of a client side interface divided into a grid of tiles.

Consider a graph with relations between the nodes changing over time. Here we assume that the relations between the nodes in a graph are static at any point of time. To these application scenarios where the relations change very frequently, the graph layout may be updated and the corresponding static image snapshots may be updated. A graph may have static relations between the nodes at a point of time, but its content can change over time. For example in a photo tagging application, a node "new york" may have the most recently tagged photos while in an eCommerce application like eBay, it may have the most recent item listings. The framework provides a way to add additional meta data about interacting with the node. An application can define several other attributes of a graph node, images, mouse over text, text description and link URL's. FIG. 9 illustrates an example of a client side interface divided into a grid of tiles. On the server side each graph region is rendered as image and chopped into tiles of images of equal size for each zoom level. For example, as shown in FIG. 9, at the zoom level 3 the client side interface is divided into 4 tiles in the horizontal direction and 3 tiles in the vertical direction.

Input Graph Data—102

Referring again to FIG. 8, the framework 100, in an example embodiment, defines an XML format in which the input graph data 102 to the framework 100 may need to be specified. Along with the node and edge information, the graph can define several visual attributes of the node and other configuration parameters like the number of zoom levels, size of the tiles at each of the zoom levels, etc. Each node in the graph can also be defined minLevel and maxLevel between which the node is displayed.

Graph Layout Component—104

Given a graph G, the graph layout component 104, according to example embodiment, calculates the position of nodes and the curve to be drawn for each edge. The framework 100 poses constraints on the graph layout component 104 that the node size is taken into account when the positions are computed. Many simple and complex graph layout processes can be implemented in the graph layout component 104 of the framework 100. One example constraint in the graph layout component 104 is that time taken to compute the layout increases exponentially as the graph size increases to large sizes. Typically, this problem is solved by pre-computing the approximate position of the nodes and running the graph layout process. Another approach for computing the layout of large scale graphs is using the clusters available in the graph. Below, we describe one such way when we adapt the force directed graph layout process to search a result cluster graph by taking advantage of implicit clusters present in the graph.

The context of semantic zooming in the framework 100 provides another example constraint. Absolute position of any node should remain the same at each of the zoom levels. For example, the node "star wars" is defined at an absolute position of (x, y) as 45678, 32456. This node remains in the same position at each zoom level, though the node size could be different at each of the zoom levels. The graph layout component 104 is intentionally separated from the rest of the rendering interface as we could imagine many complex applications that could be adapted to the framework 100.

Graph Rendering Component—106

In an example embodiment, the output of the graph layout component 104 is the position information of the nodes and edges. Given the position information of the graph, the graph rendering component 106 renders the graph and generates tiles of sub graph images at each of the zoom levels. Here, we first describe how the framework 100 defines the division of the graph into tiles and then the sliding window approach the framework 100 takes to generate the images across the whole graph.

Drawing the Graph as Tiles of Images

The spatial mapping and absolute position of nodes in the graph layout provides the ability of dividing the canvas on the client side in the form of a grid of sub images. Each tile in the grid is numbered in the form of x and y co-ordinates as shown in FIG. 9. At each of the zoom levels, the canvas is divided into m×n tiles of sub images and each sub image is of width $g_w$ and height $g_h$, thus the total size of the canvas would be $m*g_w \times n*g_h$ on the client side. Both the grid size and grid unit sizes at each of the zoom level are provided as parameters which can be configured in the framework.

Rendering of the Graph Using SVG

To render the nodes and edges of the graph, we use the graphics language SVG. The position information of the nodes and the visual attributes of the node can be represented in the SVG, which can then be viewed using a browser and external viewers. However, we need a static image generated from SVG to be stored at the server. To achieve this, we use the open source tool batik to generate the image from the SVG. Given that we can generate the image from SVG, we can generate one single SVG file for the whole graph and generate the image from the SVG and chop it into several sub images. However, this is not possible as the generated image and SVG file is huge and cannot be practically generated. To alleviate this problem, we take the sliding window approach on the server side to generate the images for each of the zoom levels.

Sliding Window Approach

At each zoom level, image snapshots of the graph are generated by taking the sliding window approach. For example, at any point we take a window of a sub-graph, generate its image snapshot, and move the sliding window to the adjacent sub regions to generate the image snapshots and continue the process for the whole graph. For example, consider a sub graph window of a 100×100 from 30400, 45600 to 30500, 45700. In this example, we take all the nodes which are contained in that window and are visible at that zoom level, and construct a sub graph which is visible at that window. The corresponding SVG of the sub-graph is generated and then converted into a raster image using a toolkit such as Batik. Later the image is chopped down into individual sub images according to the grid unit size of the window.

Search Result Cluster Navigation

The challenge of providing a manageable navigation experience exists whether it is over a document repository within a site, or over the World Wide Web, or on an eCommerce site like eBay with millions of item listings at any point of time. Typical navigation occurs in a host, such as eBay, using a search and the number of search results often overwhelms the users. Here, we describe how the framework may be used, in an example embodiment, to navigate the graph of search result clusters and improve the navigation experience and discover the relationships within the host (e.g., eBay) item data. Next, we describe how we construct a graph from the eBay data taking advantage of the cluster relationships and apply the framework to render the graph and visualize it on the client side.

Search Results Data

In this sub section, we describe the data we use in a particular embodiment from the host (e.g., eBay) to construct the graph.

Item Listings Data

Item listings are typically entered by sellers and generally constitute an image, title, category and description of an item they would like to sell on the host (e.g., eBay) site. Sellers typically use the title of the item to summarize the item. At any point of time, there may be millions of listings on eBay. For example, here are a few item titles entered by the sellers to describe the item.

7×10 FINE PERSIAN TABRIZ DESIGN ORIENTAL WOOL AREA RUG
  APPLE IPOD 4 GB WHITE NANO 1st GENERATION 1 DAY AUCTION

Search Results

When a user searches on eBay using a search query, the search results are computed using multiple factors, including item titles. There may be thousands of search results for any single search query. For example for a search query "new york" there are about 70,000 search results.

Top Search Queries

All the search queries from the users are ranked by the number of times the search query is performed. Top search queries constitute important concepts in the data as these queries are most frequently used by buyers to search for items. For example here are few sample top search queries on eBay. "nintendo wii", "xbox 360", "harry potter", "ipod", "coach", "playstation 3", "psp", "coach", "ipod nano".

Graph Construction Process in an Example Embodiment

In an example embodiment, we construct the graph from the search results data in the following way: for a given search query $q_i$ we group the search results into n clusters $C_{qi1}$, Cqi2, ... $C_{qin}$ and a sub graph $G_{si}$ is constructed depicting the relationships between these search result clusters. Now we generalize this over top M search queries. For example, we construct M sub graphs for each of the top M search queries. Using these sub graphs, we find the relationships between the top M search queries and construct a global graph. In the following sub sections we discuss in detail how we construct the sub graphs and later use these sub graphs to construct a global graph from the eBay data.

Top Level Nodes

We may use the top 10,000 search queries on eBay to indicate the top level nodes in the graph as they constitute the important concepts. Each top level node can be regarded like a country or state as in the map, which users can delve into to see more details.

Sub Graph Construction

Figure 10:
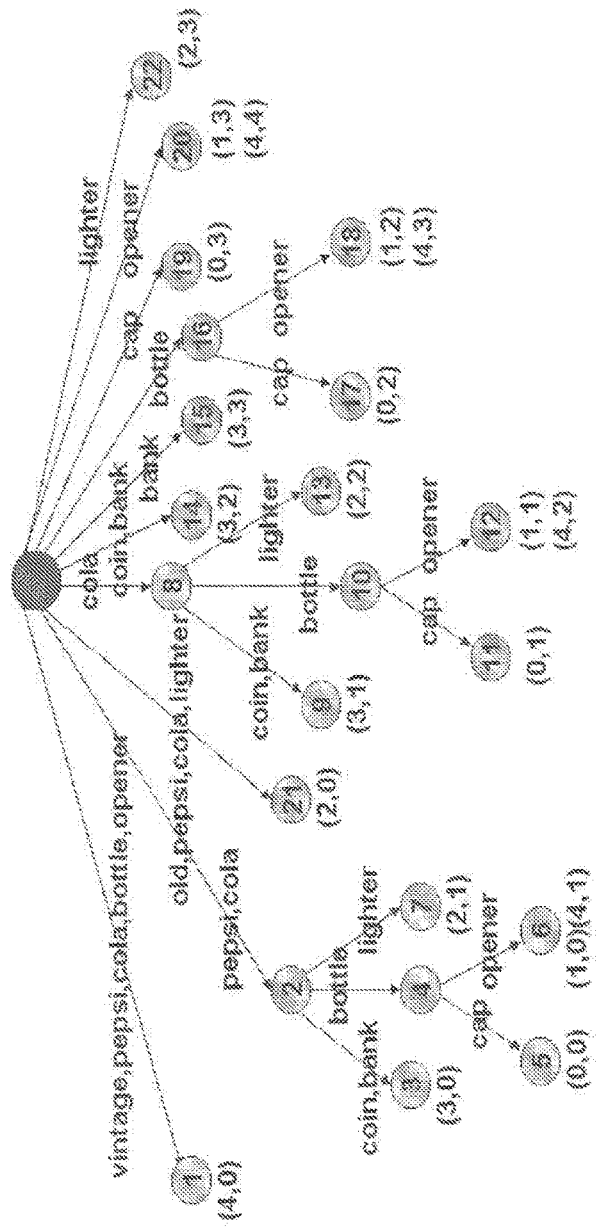
FIG. 10 illustrates an example of a suffix tree constructed from sample item listings of the top level node, "pepsi cola".

In an example embodiment, we construct a sub graph $G_{si}$ surrounding each of the top level nodes $T_i$ where i=1 ... M. To construct the sub graph $G_{si}$ we take the search results of all the item listings for the top level node and use a suffix tree clustering algorithm to cluster the search results and get the sub graph surrounding the top node. For example, to construct the sub graph around the top level node "pepsi cola", we take all the item search results in eBay for search query "pepsi cola" and cluster the search results using suffix tree. FIG. 10 illustrates an example of a suffix tree constructed from sample item listings of the top level node, "pepsi cola". All the base clusters (nodes) in the suffix tree are processed to construct a graph. To construct a graph from these base clusters, links or edges are added between the base clusters whenever there are at least 50% of documents overlapping between the base clusters. The process is repeated for each of the top level nodes to construct the corresponding sub graph.

Suffix Tree Clustering

Figure 11:
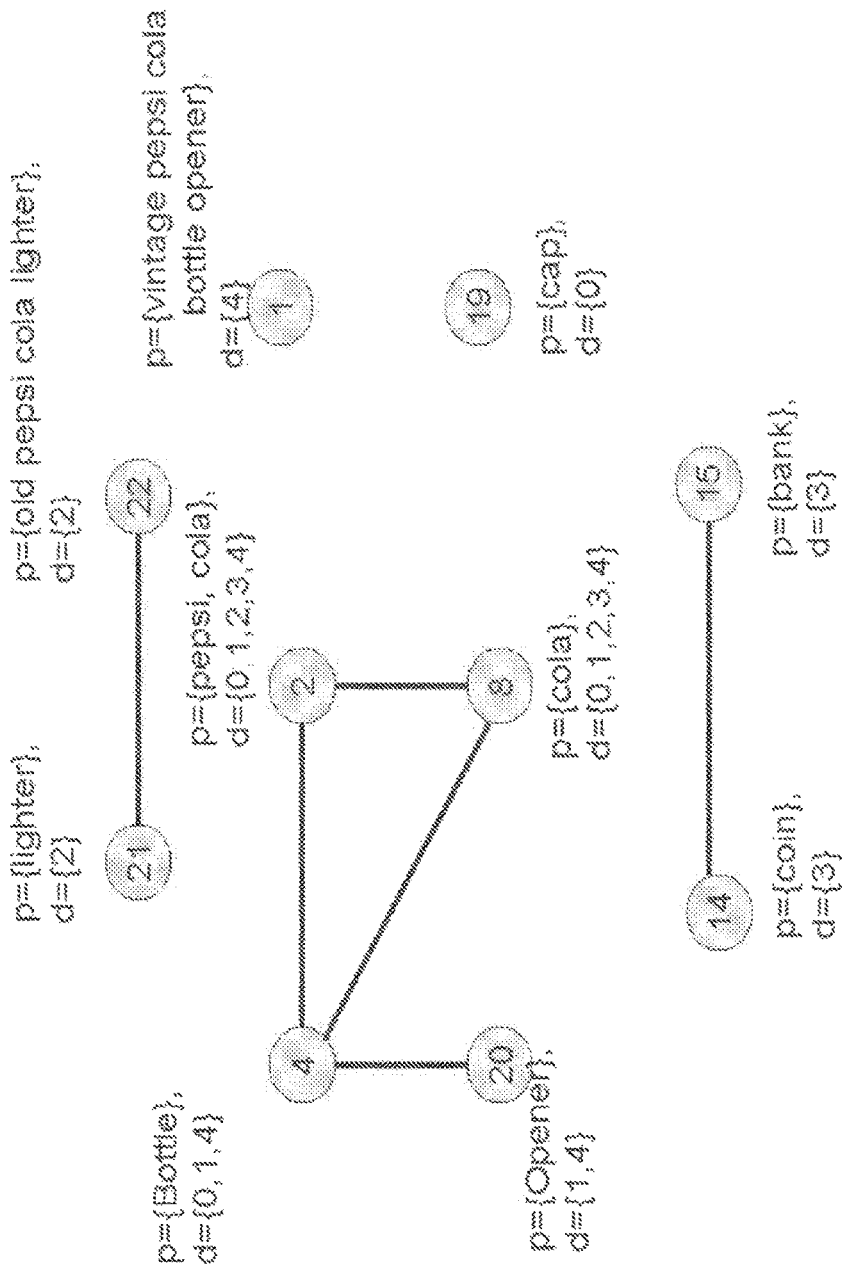
FIG. 11 illustrates the sub graph constructed from the suffix tree shown in FIG. 10.

The suffix tree clustering process (STC) of a particular embodiment involves building a suffix tree of the terms in documents that are to be divided into groups of clusters based upon the commonality of phrases in the documents. For example, FIG. 10 illustrates an example of how a suffix tree is constructed using the item titles of the following five listings "Pepsi Cola Bottle Cap", "Pepsi Cola Bottle Opener", "Old Pepsi Cola Lighter", "Pepsi Cola Coin Bank", "Vintage Pepsi Cola Bottle Opener". FIG. 11 illustrates the sub graph constructed from the suffix tree shown in FIG. 10. Each node in the resultant suffix tree is regarded as base cluster. Once we get the list of base clusters, the suffix tree is no longer needed. To construct a graph from these base clusters, links or edges are added between the base clusters whenever there are at least 50% of documents overlapping between the base clusters.

Global Graph Construction

Given a sub graph $G_{si\ s}$ and the top level nodes $T_i$ (i=1 ... M), we note that each of the sub graphs $G_{si}$ is independent and may contain common nodes including the top level nodes. For each top level node $T_j$ and its sub graph $G_{si}$, if there are other top level nodes $T_j$ (j≠i) in the sub graph, we add an edge from top level node $T_i$ to $T_j$. For example, both "ipod" and "ipod nano" can be top level nodes and have an individual sub graph. In the "ipod nano" sub graph, if there exists a node "ipod" which also is a top level node, in that case, we remove the node "ipod" from the "ipod nano" sub graph and add an edge from "ipod nano" to "ipod" at the top level node of the graph. In this way, we construct the global graph of relations between the top level nodes $T_i$ (i=1 ... M). Now we have a global graph depicting the relations between the top level nodes and a sub graph for each of the top level nodes.

Graph Layout Algorithm

In a particular embodiment, we can use the multi scale force directed layout process to come up with an aesthetically looking layout of the nodes and edges. The idea of a force directed layout process is to consider a force between any two nodes and minimize the energy of the system by moving the nodes and changing the forces between them. This layout algorithm is useful for visualizing very large undirected networks and guarantees that topologically near nodes are placed in the same vicinity, and far nodes are placed far from each other. Typical force directed layout algorithms cannot handle large graphs due to the time complexity. We use the multi-scale force directed layout process using a force directed layout algorithm.

Given that we have a global graph G of top level nodes and individual sub graphs for each of the top level nodes $G_{si}$, we can merge the global graph and the sub graphs and for the merged graph, we can compute the graph layout using the force directed graph layout algorithm. But, this may not be feasible as the time complexity for computing the layout is high for this large merged graph. In a particular embodiment, we can solve this by taking advantage of the sub graphs and the global graph. We compute the layouts for the global graph and the sub graphs individually and then merge the layout to compute the layout of the merged graph. For computing the sub graph layout, we use a simple force directed layout process. For the global graph of top level nodes, we can use the multi scale force directed layout process.

Sub-Graph Layout

We apply the force directed layout algorithm to determine the graph layout for each of the sub graphs $G_{si}$. The position of the nodes in each of the sub graphs is relative to that sub graph layout. For example, the positions of the nodes in the sub graph of, "ipod nano" run from 0, 0 to 5000, 5000. The positions of the nodes in the sub graph of, "disney" runs from 0, 0 to 8000, 8000. Thus, all the positions of the nodes within each sub graph are relative to that sub graph.

Global Graph Layout

In a manner similar to the sub graph layout, we can apply the force directed layout process to each of the top level nodes and determine the relative layout of the top level nodes. The positions of the resultant top level node graph can range from 0,0 to 300000,300000. Given that each of the top level nodes have a relative position in the global graph, now we have to come up with a way to embed the sub graph of the top level nodes into the global graph to get the absolute position of each node in the merged graph.

Merging Sub Graph and Global Graph Layouts

Given the layout of each of the individual sub graphs and the layout of the top level nodes in the global graph, we can use the following operations to determine the absolute positions of the nodes in the merged graph.

For each top level node $T_i$ in the graph:
  a) Using the position of the top level node $T_i$ update the relative co-ordinates of the nodes in the sub graph $G_{si}$;
  b) Embed the updated sub graph $G_{si}$ at the position of top level node in the global graph; and
  c) Update the rest of the co-ordinates in the global graph to take into account the embedded sub graph.

Figure 12:
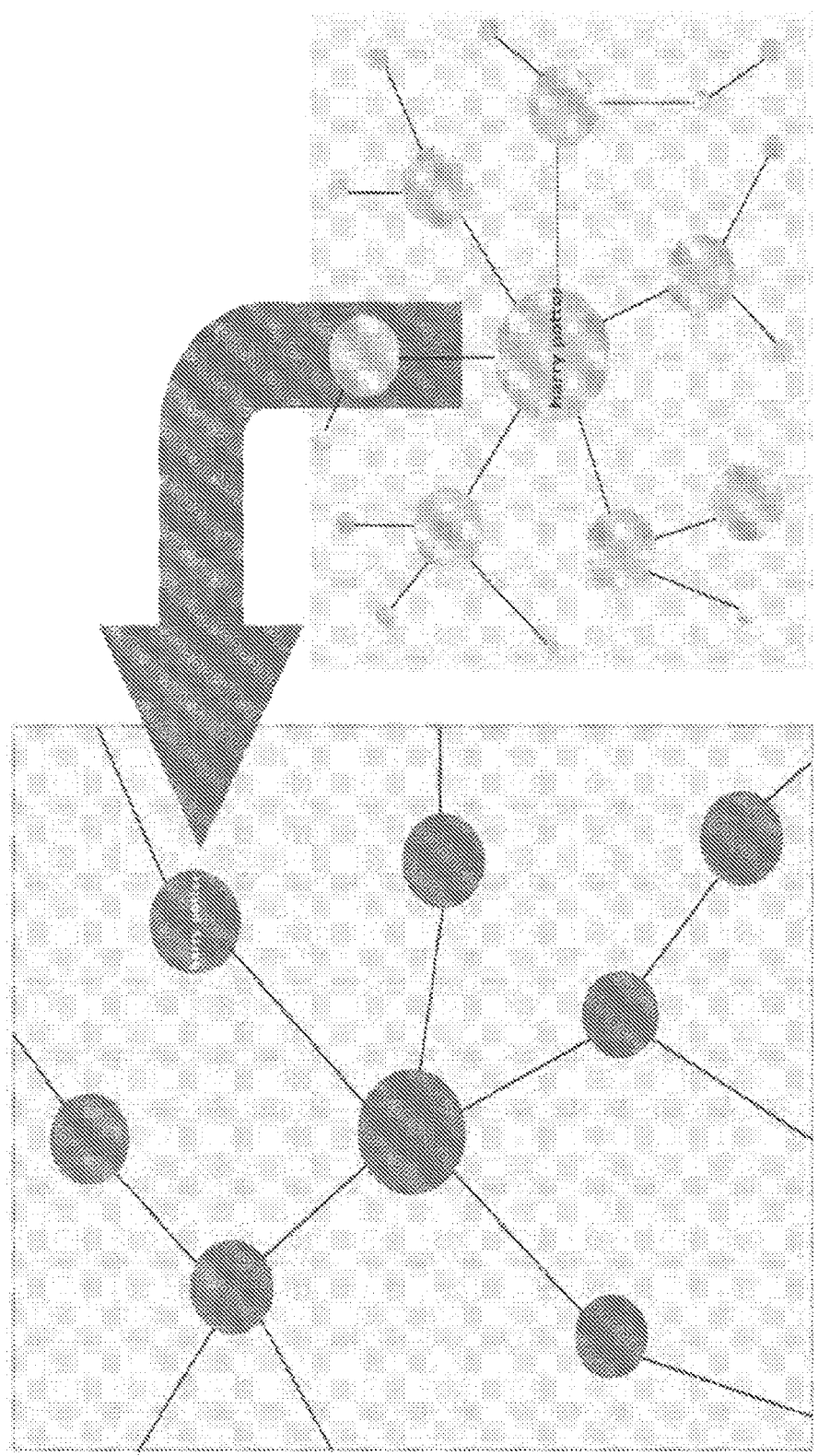
FIG. 12 illustrates an example of how a sub graph "harry potter" is embedded in the global graph.

FIG. 12 illustrates an example of how a sub graph "harry potter" is embedded in the global graph. As shown in FIG. 12, the global graph on the left is merged by embedding the sub graph on the right at the position of the top level node in the global graph. The sub graph is embedded by updating the position information in the sub graph and updating the positions of other top level nodes in the global graph to make room for the embedded sub graph. The process is repeated by embedding each of the sub graphs in the global graph to get a merged graph containing absolute position information for each and every node.

Figure 13:
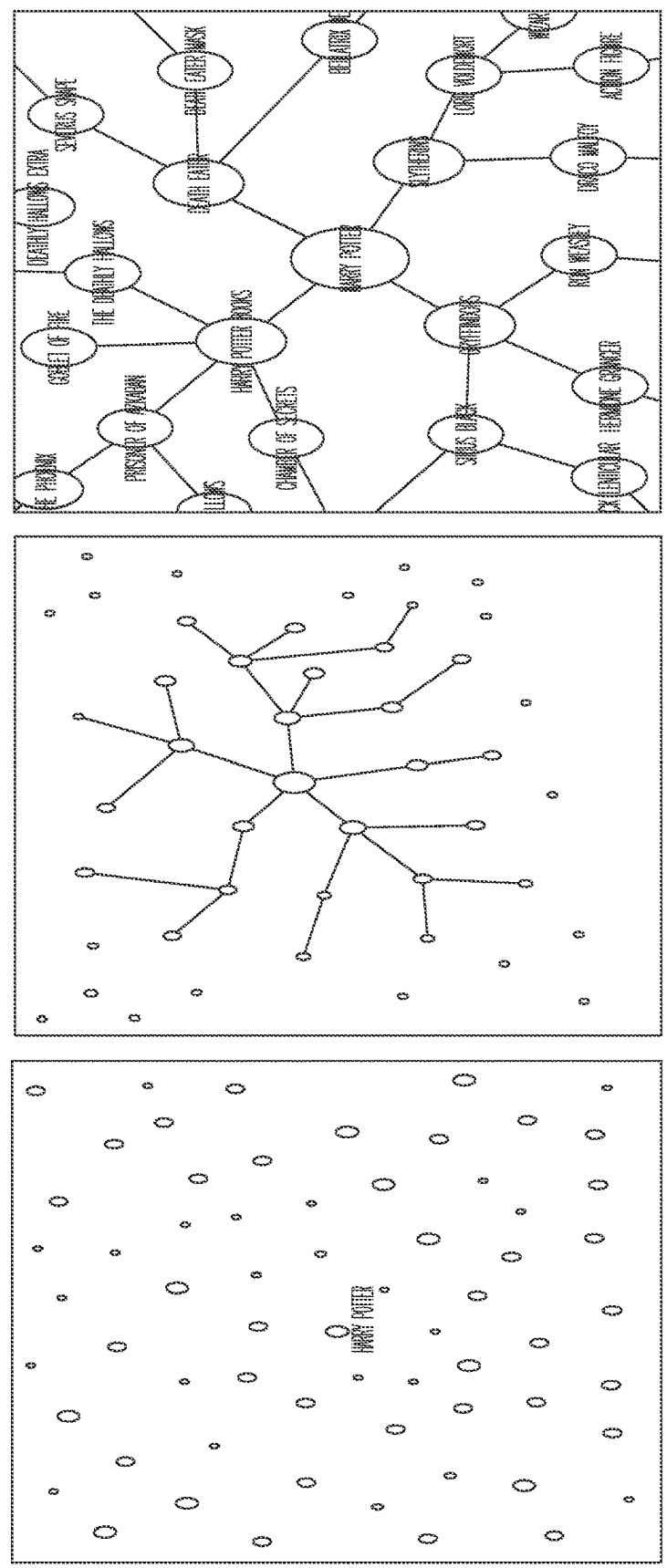
FIG. 13 illustrates an example of three graph views on the client side at each of the zoom levels.

FIG. 13 illustrates an example of three graph views on the client side at each of the zoom levels. At zoom level 1 at the left of FIG. 13, top search nodes are displayed at their absolute positions in the map. Edge information is not shown at this zoom level to improve the readability. At zoom level 2 in the middle of FIG. 13, when a user zooms in at a region, the graph region surrounding the selected node is shown. As we move from zoom level 1 to zoom level 3 (from left to right in the example of FIG. 13), more detailed graph structure is displayed. At zoom level 3 at the right of FIG. 13, when a user searches for an input query, we display the graph region surrounding the search node. Graph node sizes increase as the zoom level increases and the number of nodes shown decreases. A user can pan across to explore more portions of the graph. The user can also zoom in and out to see more or less detail.

Rendering the Graph Views at Different Zoom Levels

For the example search result cluster graph as shown in FIG. 13, we can define three zoom levels on the client-side user interface. We can define the graph views for each of the zoom levels in the following way: at zoom level 1 (as shown at the left of FIG. 13), we have the top 100 search queries displayed at their absolute positions as shown in the left image of FIG. 13. At this zoom level, we are not displaying the edges to improve the readability and comprehensibility. As described below, we discuss another possible view for the zoom level 1 using the category map. At zoom level 2 (as shown in the middle of FIG. 13), when a user zooms in at a node or a region in the graph, we show the important nodes around the selected node as shown in the middle image of FIG. 13. As shown in the right image of FIG. 13, zoom level 3 of the graph is where we show the more detailed layout of the nodes around the selected or zoomed node.

The rendering component 106 of the framework 100 (shown in FIG. 8) on the server generates and stores the sub images 108 for each of the views. Each tile of the graph sub image is stored using the file name depicting its position and zoom level, Z_X_Y.jpg, for example to access the graph tile sub image 300,300 at zoom level 3 we access the image using the file name 3_300_300.jpg.

Category Map at Zoom Level 1

Figure 14:
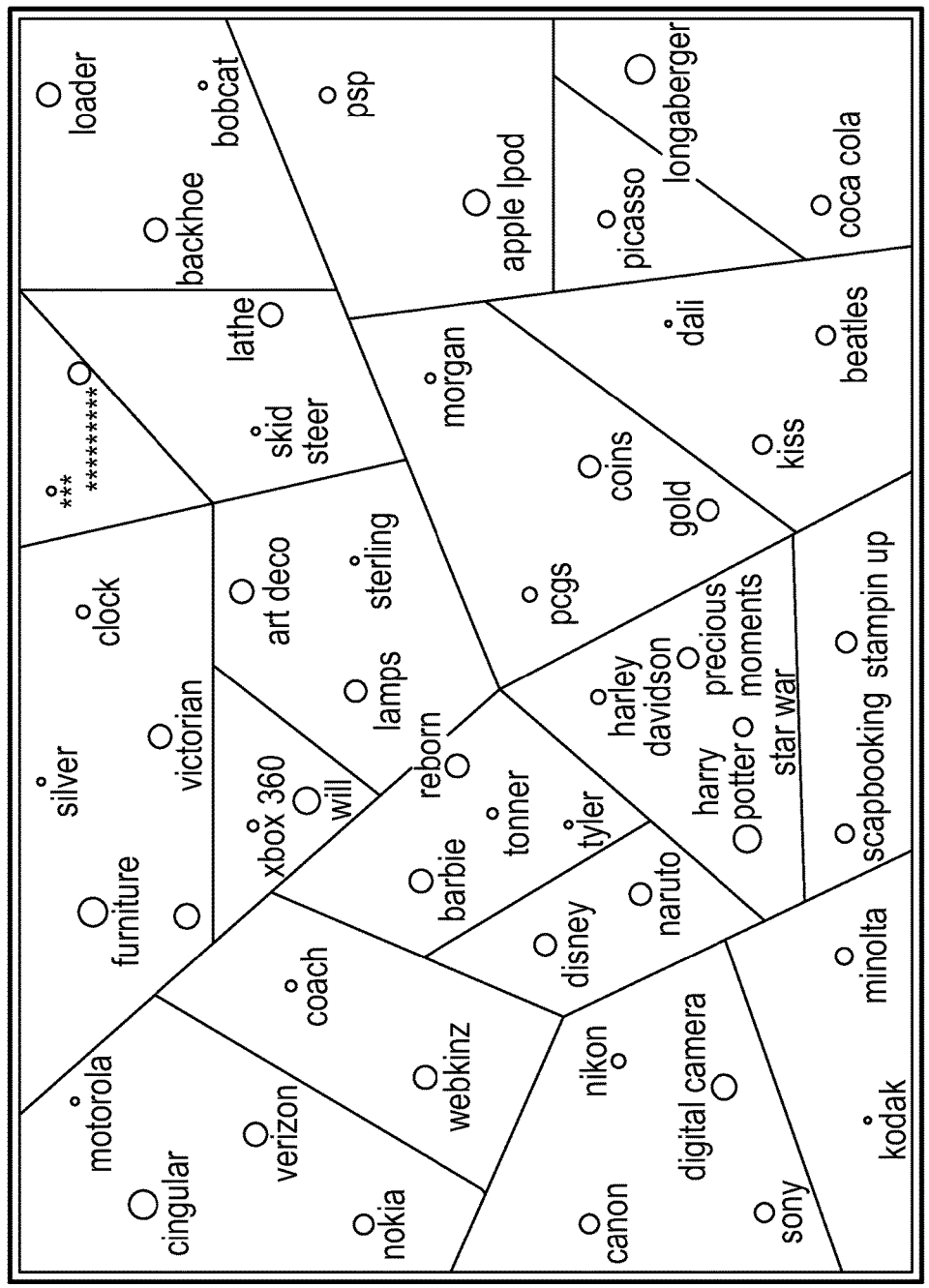
FIG. 14 illustrates a top level view with a plurality of categories.

In an alternative embodiment, another view at the zoom level 1 can be provided as shown in the example of FIG. 14. In this view, instead of maintaining the search queries over all categories, we now maintain a separate global graph of search clusters within each category. FIG. 14 illustrates such a top level view with a plurality of categories. The graph within each of the categories and the rendering is done in the same way as described above, except that boundaries for the categories are displayed. The location and shape of the boundaries depend on the size of the graph within each category. Each category here may be regarded as a state or a region in which a user can delve to see more details on that category. Referring again to FIG. 14, a category level tree map view at zoom level 1 is shown. Each category in the example of FIG. 14 can be represented by a color. The various categories may be regarded as a state or a region as in a geographical map where users can obtain more detail of a particular category of interest. This can be achieved by maintaining separate graphs at each of the categories and drawing the position of the maps depending upon the sizes of each of the graphs.

Client-Side User Interface

Figure 15:
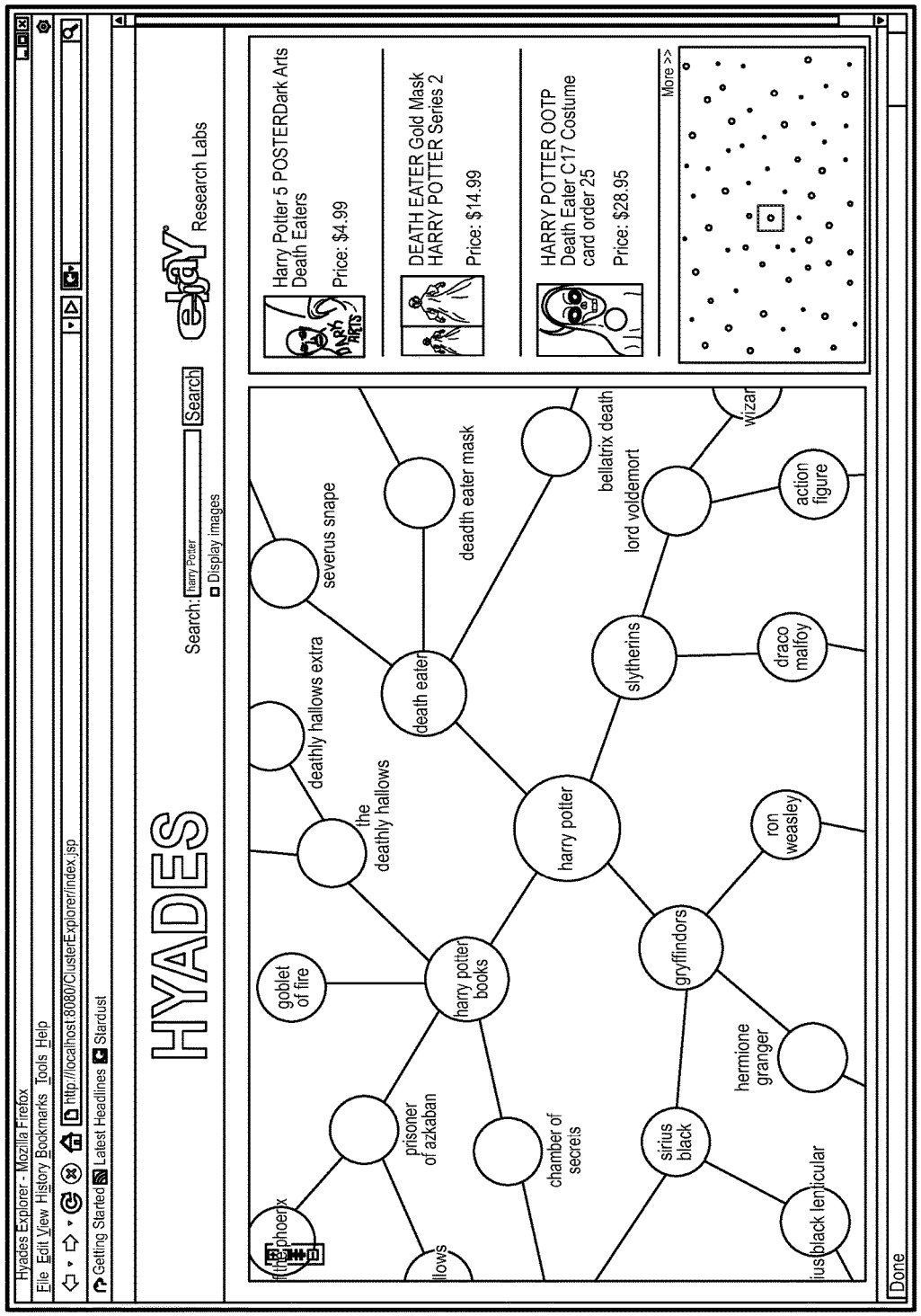
FIGS. 15 and 16 illustrate example screen shots of the client-side user interface (UI) to visualize the graph in a particular embodiment.
Figure 16:
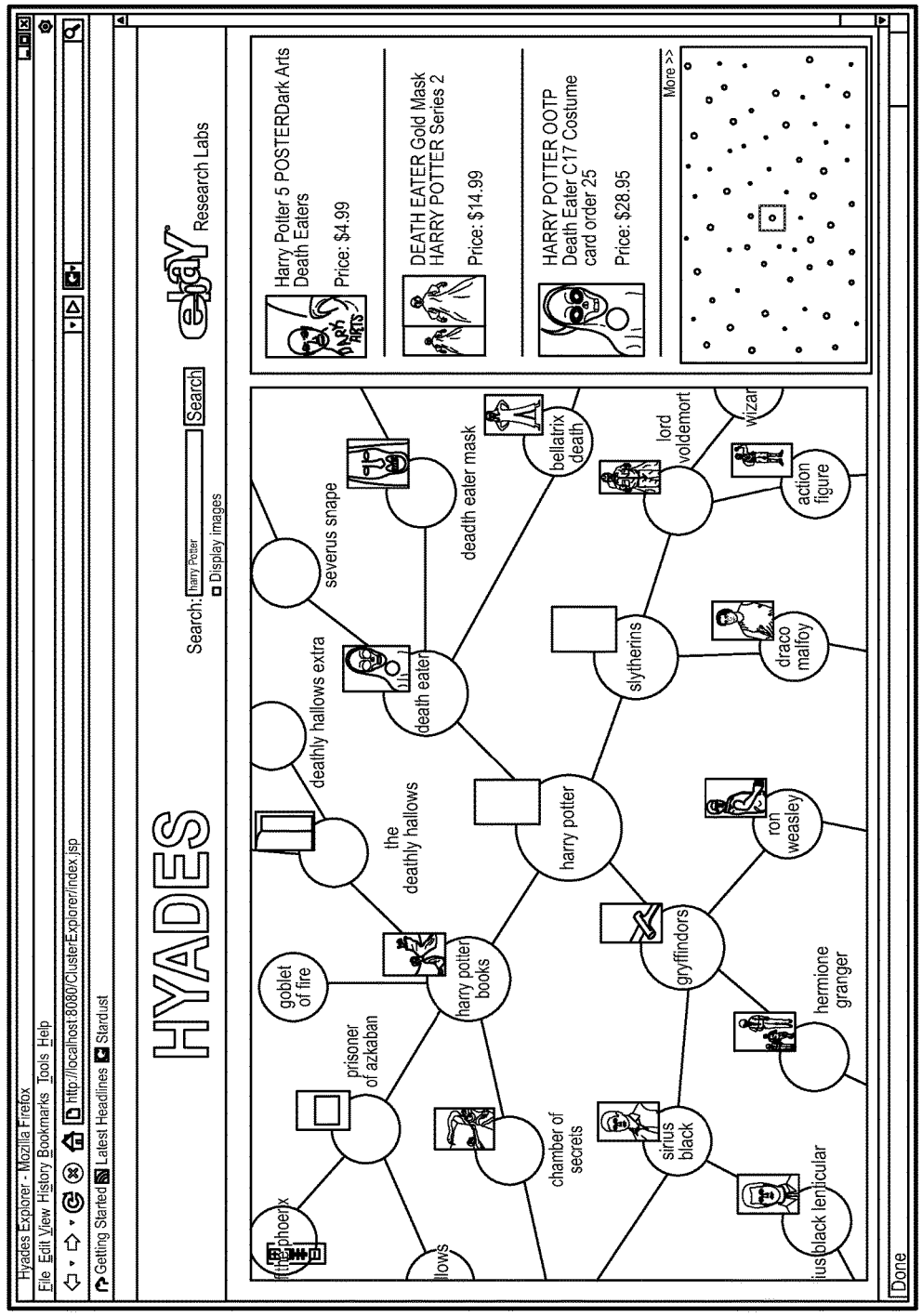

FIGS. 15 and 16 illustrate example screen shots of the client-side user interface (UI) to visualize the graph in a particular embodiment. The canvas is divided into a grid of sub images and is updated as the user drags the canvas. We use AJAX to dynamically retrieve the sub images. A particular embodiment also includes a snapshot view of the zoom level 1 (highest zoom level) displayed on the bottom of the right panel, which shows the approximate area of the graph the user is viewing.

FIG. 15 illustrates an example screen shot of the Hyades graph interface for a search query "harry potter". The example graph shown is at a zoom level 3 displaying the detailed graph around the node "harry potter". The user can clearly explore and understand the related search nodes surrounding each node. The user can pan across the graph and zoom in and out to see more or less detail. The bottom panel on the right side of the UI shows the snapshot view of zoom level 1 showing the approximate region of the graph the user is viewing at zoom level 3. The right side top panel gives item listings related to the search node. Users can select or de-select if more meta information is displayed at each node. In the next screen shot below when the meta information is selected we show the current item images for each of the nodes.

FIG. 16 illustrates an example screen shot of the Hyades graph interface for a search query "harry potter" showing meta image information at each of the nodes. The images at each of the nodes are retrieved separately from the tile images and displayed using javascript and position information.

In this disclosure, we have described the design of an example user interface graph framework that enables a user to navigate large scale graphs like a geographical map on the browser. Our system combines graph visualization with interactive map navigation in a unique way to provide a novel user experience navigating cluster data. We have demonstrated the framework by applying it on a real-world problem of visualizing graph of search result clusters from a host (e.g., eBay).

Figure 17:
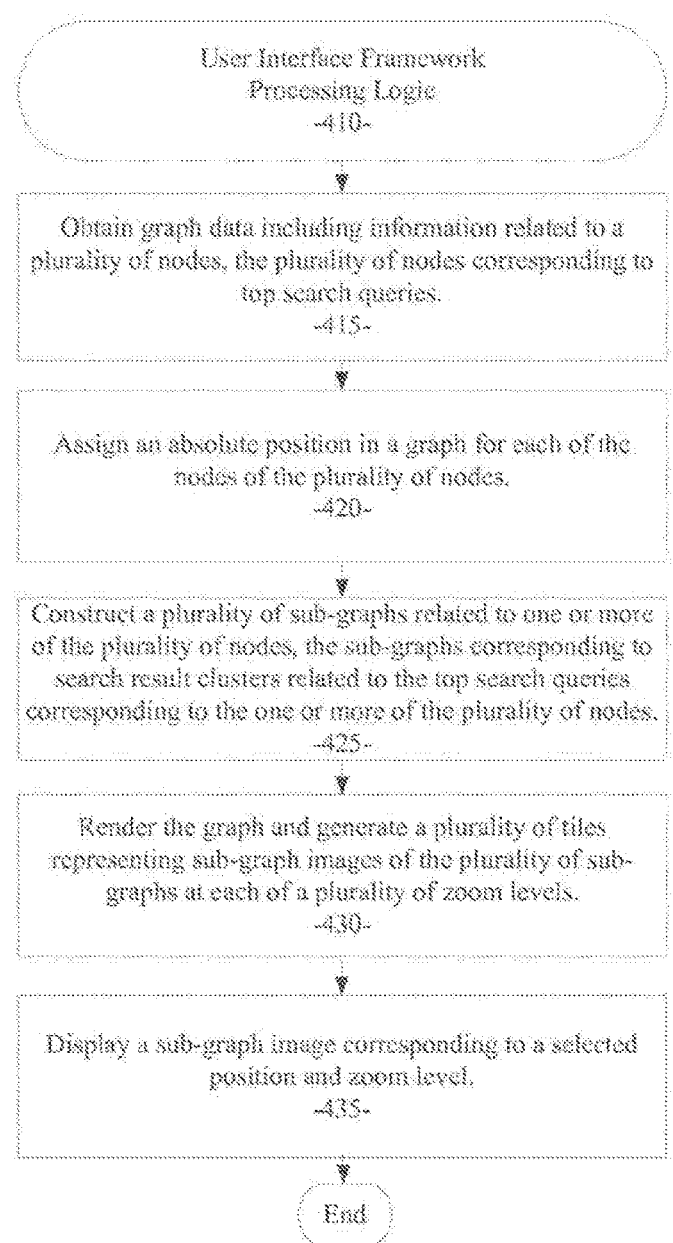
FIG. 17 illustrates a processing flow diagram for an example embodiment.

FIG. 17 illustrates a process flow diagram for an example embodiment. In the embodiment 410 shown, a computer-implemented system and method providing a user interface framework for viewing large scale graphs includes: obtaining graph data including information related to a plurality of nodes, the plurality of nodes corresponding to top search queries (processing block 415); assigning an absolute position in a graph for each of the nodes of the plurality of nodes (processing block 420); constructing a plurality of sub-graphs related to one or more of the plurality of nodes, the sub-graphs corresponding to search result clusters related to the top search queries corresponding to the one or more of the plurality of nodes (processing block 425); rendering the graph and generating a plurality of tiles representing sub-graph images of the plurality of sub-graphs at each of a plurality of zoom levels (processing block 430); and displaying a sub-graph image corresponding to a selected position and zoom level (processing block 435).

Figure 18:
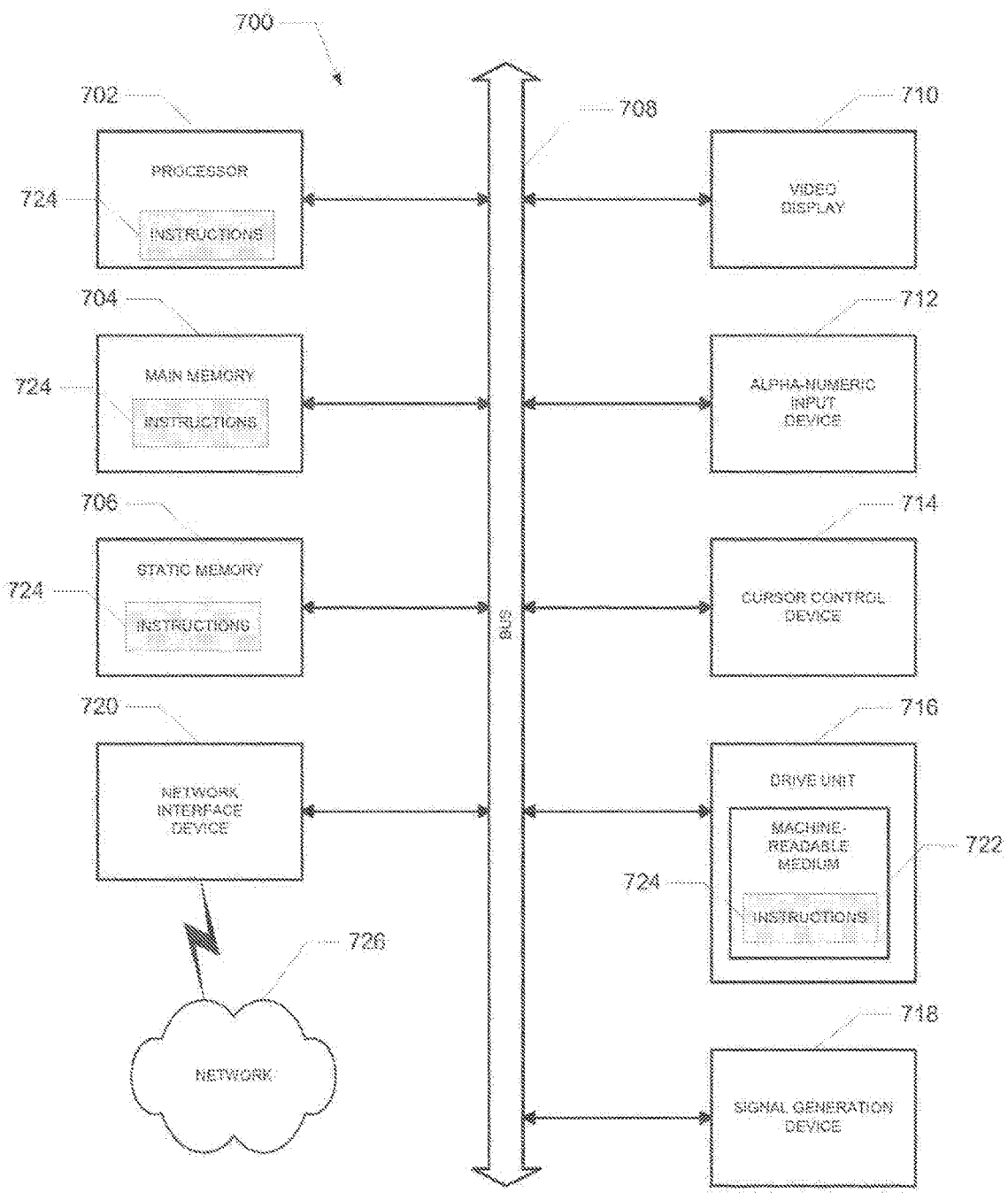
FIG. 18 shows a diagrammatic representation of a machine in the form of a computer system within which a set of instructions, for causing the machine to perform any one or more of the methodologies discussed herein, may be executed, according to an example embodiment.

FIG. 18 shows a diagrammatic representation of a machine in the example form of a computer system 700 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software) 724 embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Although the present specification describes components and functions implemented in the embodiments with reference to particular standards and protocols, the disclosed subject matter may be not limited to such standards and protocols. Each of the standards for Internet and other packet-switched network transmission (e.g., transmission control protocol (TCP)/Internet Protocol (IP) (TCP/IP), User Datagram Protocol (UDP)/Internet Protocol (IP) (UDP/IP), Hypertext Markup Language (HTML), and Hypertext Transfer Protocol (HTTP)) represent examples of the state of the art. Such standards are periodically superseded by faster or more efficient equivalents having essentially the same functions. Accordingly, replacement standards and protocols having the same functions are considered equivalents.

Modules, Components and Logic

Certain embodiments as described herein may be implemented as logic or a number of modules, components, or mechanisms. A module, logic, component, or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g. a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

An example embodiment extends to a machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

Machine-Readable Medium

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 324 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of ordinary skill in the art upon reviewing the above description.

Thus, as described above, a computer-implemented system and method providing a user interface framework for viewing large scale graphs are disclosed. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A method comprising:
    obtaining graph data including information related to a plurality of nodes; the plurality of nodes corresponding to search queries performed on a host site;
    constructing a sub-graph of additional nodes that represent search results of the search queries, the constructing of the sub-graph including generating links between the additional nodes based on an amount of overlap among the search results produced from the search queries that correspond to the one or more of the plurality of nodes, the additional nodes included in the sub-graph being clusters of the search results;
    rendering a graph by displaying each node at a respective absolute position within the graph and generating a plurality of tiles that depict images of the sub-graph at each of a plurality of zoom levels; and
    displaying a sub-graph image corresponding to a selected position and zoom level.

2. The method of claim 1, further comprising:
    assigning the absolute position to each of the plurality of nodes prior to the constructing the sub-graph.

3. The method of claim 1; wherein the constructing the sub-graph includes:
    generating the additional nodes related to the one or more of the plurality of nodes; and
    generating links between the additional nodes and the one or more of the plurality of nodes based on determining that the amount of overlap exceeds a threshold value.

4. The method of claim 3, wherein the additional nodes are each assigned an absolute position within the graph that is proximate to the absolute position of each of the plurality of nodes.

5. The method of claim 1, further comprising:
    storing the plurality of tiles representing images of the sub-graph in a database.

6. The method of claim 1, wherein the search queries are top search queries identified based on a number of instances in which the search queries are performed by users of the host site.

7. The method of claim 1, wherein the generating the plurality of tiles at each of the plurality of zoom levels includes generating the plurality of tiles at various levels of detail based on the plurality of zoom levels.

8. The method of claim 1, further comprising:
    generating a global graph depicting a relationship between the plurality of nodes and the sub-graph related to the one or more of the plurality of nodes.

9. The method of claim 1, further comprising:
    displaying a snapshot view of a highest zoom level showing an approximate area of a graph a user is viewing.

10. The method of claim 1, further comprising:
    displaying meta information at each node of the plurality of nodes.

11. A system comprising:
    one or more processors and executable instructions accessible on a computer-readable medium that, when executed, configure the one or more processors to at least:

obtain graph data including information related to a plurality of nodes, the plurality of nodes corresponding to search queries performed on a host site;

construct sub-graph of additional nodes that represent search results of the search queries, the constructing of the sub-graph including generating links between the additional nodes based on an amount of overlap among the search results produced from the search queries that correspond to the one or more of the plurality of nodes, the additional nodes included in the sub-graph being clusters of the search results;

render a graph by displaying each node at a respective absolute position within the graph and generating a plurality of tiles that depict images of the sub-graph at each of a plurality of zoom levels; and display a sub-graph image corresponding to a selected position and zoom level.

12. The system of claim 11, wherein the one or more processors are further configured to assign the absolute position to each of the plurality of nodes prior to the construction of the sub-graph.

13. The system of claim 11, wherein the one or more processors are further configured to:

generate the additional nodes related to the one or more of the plurality of nodes; and generate links between the additional nodes and the one or more of the plurality of nodes based on determining that the amount of overlap exceeds a threshold value.

14. The system of claim 13, wherein the additional nodes are each assigned an absolute position within the graph that is proximate to the absolute position of each of the plurality of nodes.

15. The system of claim 11, wherein the one or more processors are further configured to store the plurality of tiles representing images of the sub-graph in a database.

16. The system of claim 11, wherein the search queries are top search queries identified based on a number of instances in which the search queries are performed by users of the host site.

17. The system of claim 11, wherein the one or more processors are further configured to generate the plurality of tiles at various levels of detail based on the plurality of zoom levels.

18. The system of claim 11, wherein the one or more processors are further configured to generate a global graph depicting a relationship between the plurality of nodes and the sub-graph related to the one or more of the plurality of nodes.

19. The system of claim 11, wherein the one or more processors are further configured to display a snapshot view of a highest zoom level showing an approximate area of a graph a user is viewing.

20. A non-transitory machine-readable medium storing instructions that, when executed by one or more processors of a machine, cause the machine to perform operations comprising:

obtaining graph data including information related to a plurality of nodes, the plurality of nodes corresponding to search queries performed on a host site;

constructing a sub-graph of additional nodes that represent search results of the search queries, the constructing of the sub-graph including generating links between the additional nodes based on an amount of overlap among the search results produced from the search queries that correspond to the one or more of the plurality of nodes, the additional nodes included in the sub-graph being clusters of the search results;

rendering a graph by displaying each node at a respective absolute position within the graph and generating a plurality of tiles that depict images of the sub-graph at each of a plurality of zoom levels; and displaying a sub-graph image corresponding to a selected position and zoom level.

\* \* \* \* \*